United States Patent
Mangalam

(10) Patent No.: US 7,302,838 B2
(45) Date of Patent: Dec. 4, 2007

(54) SYSTEM AND METHOD FOR CLOSED LOOP CONTROL OF BOUNDARY LAYER SHEAR STRESS

(75) Inventor: Siva M. Mangalam, Williamsburg, VA (US)

(73) Assignee: Tao of Systems Integration, Inc., Hampton, VA (US)

( * ) Notice: Subject to any disclaimer, the term of this patent is extended or adjusted under 35 U.S.C. 154(b) by 139 days.

(21) Appl. No.: 11/076,274

(22) Filed: Mar. 9, 2005

(65) Prior Publication Data

US 2005/0199052 A1   Sep. 15, 2005

Related U.S. Application Data

(60) Provisional application No. 60/552,539, filed on Mar. 12, 2004.

(51) Int. Cl.
G01M 9/00 (2006.01)
(52) U.S. Cl. .................. 73/147; 73/117.2; 73/117.3; 73/118.1; 73/204.18; 73/204.26
(58) Field of Classification Search .............. 73/117.2, 73/117.3, 118.1, 147, 204.18, 206.262
See application file for complete search history.

(56) References Cited

U.S. PATENT DOCUMENTS

| | | | |
|---|---|---|---|
| 4,229,725 A | 10/1980 | Reilly | |
| 4,563,684 A | 1/1986 | Maris | |
| 4,649,387 A | 3/1987 | Maris | |
| 4,727,751 A | 3/1988 | Holmes et al. | |
| 4,848,153 A | 7/1989 | Stack et al. | |
| 4,932,610 A | 6/1990 | Maestrello | |
| 4,936,146 A | 6/1990 | Stack et al. | |
| 5,074,147 A | 12/1991 | Sarma | |
| 5,209,111 A | 5/1993 | Agarwal et al. | |
| 5,218,863 A | 6/1993 | Mangalam | |
| 5,299,455 A | 4/1994 | Mangalam | |
| 5,600,060 A | 2/1997 | Grant | |

(Continued)

OTHER PUBLICATIONS

S. Mangalam, "Real-Time Extraction of Hydrodynamic Flow Characteristics Using Surface Signatures", *Proceedings 13th International Symposium on Unmanned Untethered Submersible Technology*, Aug. 24-27, 2003.

(Continued)

*Primary Examiner*—Edward Lefkowitz
*Assistant Examiner*—Freddie Kirkland, III
(74) *Attorney, Agent, or Firm*—Hunton & Williams LLP

(57) ABSTRACT

A system is provided for controlling boundary layer shear stress adjacent a surface over which a fluid stream has been established. The system comprises a boundary layer control device adapted for altering at least one flow characteristic within a boundary layer in a selected region of the surface. The system further comprises a shear stress measurement system comprising a hot film sensor arrangement having at least one hot film sensor element appliable to the surface in the selected region. The at least one hot film sensor element is connected to an anemometer circuit configured to provide a sensor signal corresponding to heat transfer from the associated hot film sensor to the fluid stream. The system also comprises a control module in communication with the anemometer arrangement and the boundary layer control device. The control module is adapted for receiving and processing sensor signals signal from the anemometer circuit and for providing input signals to the boundary layer control device.

8 Claims, 16 Drawing Sheets

U.S. PATENT DOCUMENTS

| | | |
|---|---|---|
| 5,796,612 A | 8/1998 | Palmer |
| 5,890,681 A | 4/1999 | Meng |
| 6,024,119 A | 2/2000 | Kirschner |
| 6,134,959 A | 10/2000 | Mangalam et al. |
| 6,169,496 B1 | 1/2001 | Martin et al. |
| 6,253,126 B1 | 6/2001 | Palmer |
| 6,371,414 B1 * | 4/2002 | Truax et al. ............... 244/201 |
| 6,390,417 B1 | 5/2002 | Yoshino |
| 6,424,923 B1 | 7/2002 | Huyer et al. |
| 6,732,579 B2 | 5/2004 | Keith et al. |

OTHER PUBLICATIONS

S. Mangalam, "Phenomena-Based Real-Time Aerodynamic Measurement System (PRAMS)", *2003 IEEE Aerospace Conference Proceedings*, Mar. 8-15, 2003.

PCT/US05/08145, Sep. 14, 2006, International Search Report, 6 pgs.

* cited by examiner

SYSTEM AND METHOD FOR CLOSED LOOP CONTROL OF BOUNDARY LAYER SHEAR STRESS

CROSS-REFERENCE TO RELATED APPLICATIONS

This application claims priority to U.S. Provisional Application No. 60/552,539, filed Mar. 12, 2004, and to U.S. application Ser. No. 10/778,666 ('666 Application), filed Feb. 13, 2004 as a continuation-in-part of U.S. application Ser. No. 10/653,494, now U.S. Pat. No. 6,826,493 ('493 Patent), filed Sep. 2, 2003, all of which are incorporated herein by reference in their entirety.

FIELD OF THE INVENTION

The invention relates generally to boundary layer flow control and, more particularly, to a system that uses thin film sensors for measurement and control of shear stress at the surface of a body immersed in a fluid stream.

BACKGROUND OF THE INVENTION

It is well known that boundary layer flow over a surface may be altered to change the boundary layer flow and resulting macroscopic parameters such as drag in the case of an aerodynamic body or flow energy loss in pipe flow. Controlling boundary layer separation for example, can be used to reduce form drag and control the unstable pressure fluctuations associated with separation. Separation increases the drag on the body due to the altered distribution of pressure when the flow separates. Preventing or delaying separation may reduce this drag. Delaying separation or inhibiting separation can also reduce pressure fluctuations.

Depending on the fluid, boundary layer control may be accomplished using any of a variety of methods. When the fluid is a gas, the usual method of altering the boundary layer is to increase or decrease pressure at the surface by injecting (or withdrawing) the fluid through ports formed through the surface. Another method is to introduce a different fluid into the stream adjacent the surface. Still other methods use magnetic fields to alter the flow of fluids having certain electromagnetic properties. Combinations of these methods may also be used.

One problem with all the above methods of altering boundary flow, is that they are generally difficult to use effectively in unsteady flow regimes. Most often, the use of boundary layer control devices is determined based on an overall flow regime. For example, boundary layer control on a wing structure may be based on overall flow parameters such as angle of attack and freestream velocity. The actual control inputs to the boundary layer control device are empirically determined for various flow conditions and are then applied based on measurement or calculation of these parameters in flight. This approach has some inherent drawbacks. For example, it does not account for differences in behavior at different points on a three dimensional structure. Moreover, it does not provide for real time control in unsteady flow regimes. As a general matter, there has not been a practical system for controlling boundary layer characteristics in unsteady, multidimensional flow regimes.

SUMMARY OF THE INVENTION

The present invention provides a system and method for influencing flow interaction characteristics based on control of boundary layer shear stress. An illustrative embodiment provides a system for controlling boundary layer shear stress adjacent a surface over which a fluid stream has been established. The system comprises a boundary layer control device adapted for altering at least one flow characteristic within a boundary layer in a selected region of the surface. The system further comprises a shear stress measurement system comprising a hot film sensor arrangement having at least one hot film sensor element appliable to the surface in the selected region. The at least one hot film sensor element is connected to an anemometer circuit configured to provide a sensor signal corresponding to heat transfer from the associated hot film sensor to the fluid stream. The system also comprises a control module in communication with the anemometer arrangement and the boundary layer control device. The control module is adapted for receiving and processing sensor signals signal from the anemometer circuit and for providing input signals to the boundary layer control device.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
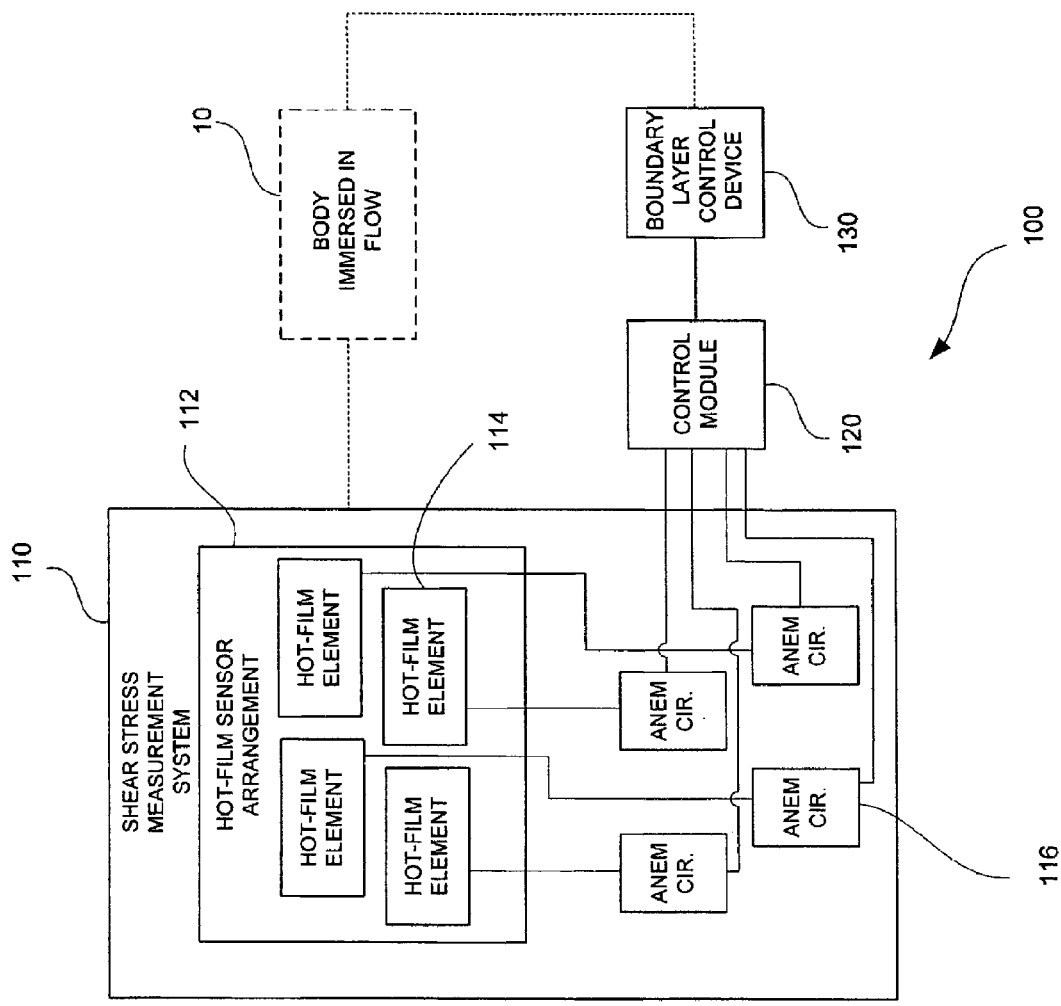
FIG. 1 is a schematic representation of a system for controlling boundary layer shear stress according to an embodiment of the invention.

The present invention provides a system for controlling boundary layer flow that makes use of a specialized sensor system that unobtrusively monitors boundary layer heat transfer, changes in which are associated with various flow phenomena. The sensor system output may be used with control logic to provide commands to boundary layer flow control devices.

Boundary layer control involves making certain boundary layer flow characteristics (e.g., shear stress) at a specific location behave in a predefined way. Laminar flow control and separation control have been two areas that have received maximum attention over many decades. Practically all the effort, however, was limited to either passive control or active, open-loop control. Heretofore, there has been no successful demonstration of a real-time shear stress control system. The primary limitation has been the inability to reliably measure shear stress in real time. Reliability of shear stress sensor output is limited by how well the sensor responds to shear stress versus other extraneous factors (e.g. ambient temperature changes, altitude changes, and electronic noise).

As discussed in more detail below, the shear stress sensor reliability problem has been overcome through the use of a novel shear stress measurement system that uses thin film sensors in conjunction with constant voltage anemometer circuitry.

As used herein, the term boundary layer flow control devices means any controllable system known in the art for altering flow in the boundary layer adjacent a surface immersed in a fluid. For illustration purposes, the following discussions focus on a particular control device that makes use of a pressure port manifold for introducing or withdrawing the working fluid to or from the boundary layer. While this boundary layer control device is discussed in detail in the examples below, the present invention is not limited to the use of this type of device.

It will be understood by those of ordinary skill in the art that the methods of the present invention apply to all fluid flow regimes. Thus, although the term "aerodynamic" may be used in describing the phenomena that may be investigated using embodiments of the invention, the invention may also be used to investigate hydrodynamic phenomena or similar phenomena arising in any other fluid flow regime.

The invention provides a sensing system that can be located on a surface of an aerodynamic (or hydrodynamic) body without disturbing the flow around the body and without breaching the structural integrity of the body surface. This system uses surface-mounted hot-film hot-film sensors that require a minimum of under-surface modifications to the body structure and provide a high degree of spatial resolution and a high dynamic response. As described in the '666 Application and the '493 Patent, these sensors may be used to measure boundary layer shear stress, which, in turn, can be used to identify and map critical flow feature indicators (CFFIs) and separation regions for two dimensional or three dimensional unsteady flow regimes.

As discussed in U.S. Pat. No. 6,134,959 ('959 Patent), which is incorporated herein by reference in its entirety and in the '493 Patent, the location of CFFIs on a body in two dimensional or three dimensional flow may be identified by determining the shear stress and convective heat transfer at the surface of the body. Because the ultimate goal is to provide input for use in controlling boundary layer phenomena, it is important that the sensor system used to monitor these phenomena does not, itself, alter the flow. Accordingly, it is highly advantageous to use thin film sensors as described in the '959 and '493 Patents.

Hot film sensors use the principle that the resistance of a thin, hot-film element is a function of the geometry of the element and its operating temperature. The sensor element can be heated to a value above the stagnation temperature of the ambient flow to establish a temperature gradient between the sensor element and the ambient flow. This gradient causes heat to be transferred to the flow by convection and to the substrate through conduction. The heat lost to the flow through convective heat transfer may be used to measure surface flow conditions. For example, when a hot-film sensor is located at or near a flow separation or attachment point, the convective heat transfer from the sensor will be at a minimum compared to sensors located away from such points.

Hot film (or other thin film) sensors may be used in conjunction with anemometer circuits to provide signals relatable to the convective heat transfer at the sensor location. Although various types of anemometer circuits (e.g., constant current anemometers (CCA) and constant temperature anemometers (CTA)) can be used, it has been found that constant voltage anemometers (CVA) are particularly suitable for identifying and locating flow phenomena in real time. CVAs do not require critical adjustments to account for changes in flow conditions. Further, they provide a flat, customer-specified bandwidth, have high signal-to-noise ratio, and are practically immune to EMI, RFI, and cable-capacitance effects.

Conventional heat transfer techniques typically use a CTA with a hot-film sensor or a MEMS-based hot-wire sensor. The resulting measurements are usually swamped by noise and drift with ambient temperature changes. The CTA is severely affected by EMI/RFI and cable capacitance effects, and therefore requires special care even under laboratory conditions. Furthermore, the CTA Wheatstone bridge circuit itself has major reliability issues: non-linear output and drifts with temperature. The instrument bandwidth and operational capabilities e.g., without (instability and oscillations) are also affected by both environmental and actual flow conditions. Combined with a sensor that is sensitive to external factors, the time and resources to make the CTA or CCA minimally reliable outweigh the benefits.

The CVA, on the other hand, is virtually immune to EMI/RFI and cable capacitance effects, eliminates the non-linearity and temperature drift associated with the Wheatstone bridge resistance measurement, and has a much higher signal. These advantages have enabled several real-time flight monitoring systems, that were previously too difficult to accomplish with the CTA. Thus, the shear stress sensor system utilizing the CVA allows for reliable relative shear stress measurements with minimal effort. The productivity advantage becomes especially important when the control system is much more complex, involving numerous distributed sensors and actuators.

Multi-element thin film sensors can be used to map boundary layer shear stress and identify laminar, transition and turbulent flow regions. In the laminar region, the shear stress is relatively low and disturbances are minimal. The transition region is characterized by the presence of intermittent large disturbances (spikes/bursts). These are large-scale structures that eventually breakdown into smaller and more uniformly distributed disturbances (turbulence) in the turbulent region.

In addition to providing a basis for quantifying shear stress, hot film sensor data may provide information relating to other quantifiable boundary layer characteristics as well. As discussed in the '666 Application and the '493 Patent, raw hot film sensor output may be processed to provide location and strength information for various flow phenomena. This processing may be in the form of any of a variety of analytical methodologies including statistical analysis (mean, variance, skewness, flatness, etc.), spectral analysis (phase and frequency), and analysis in different domains (Fourier, wavelet, Hilbert, etc.) and other non-linear domains (neural network, etc.).

Embodiments of the present invention provide for the disposition of hot film sensor elements on the surface of a body in order to monitor boundary layer shear stress at specific surface locations downstream of a boundary layer control device. This placement allows the output of the sensor elements to be used to control the activity of the boundary layer control device.

Figure 2:
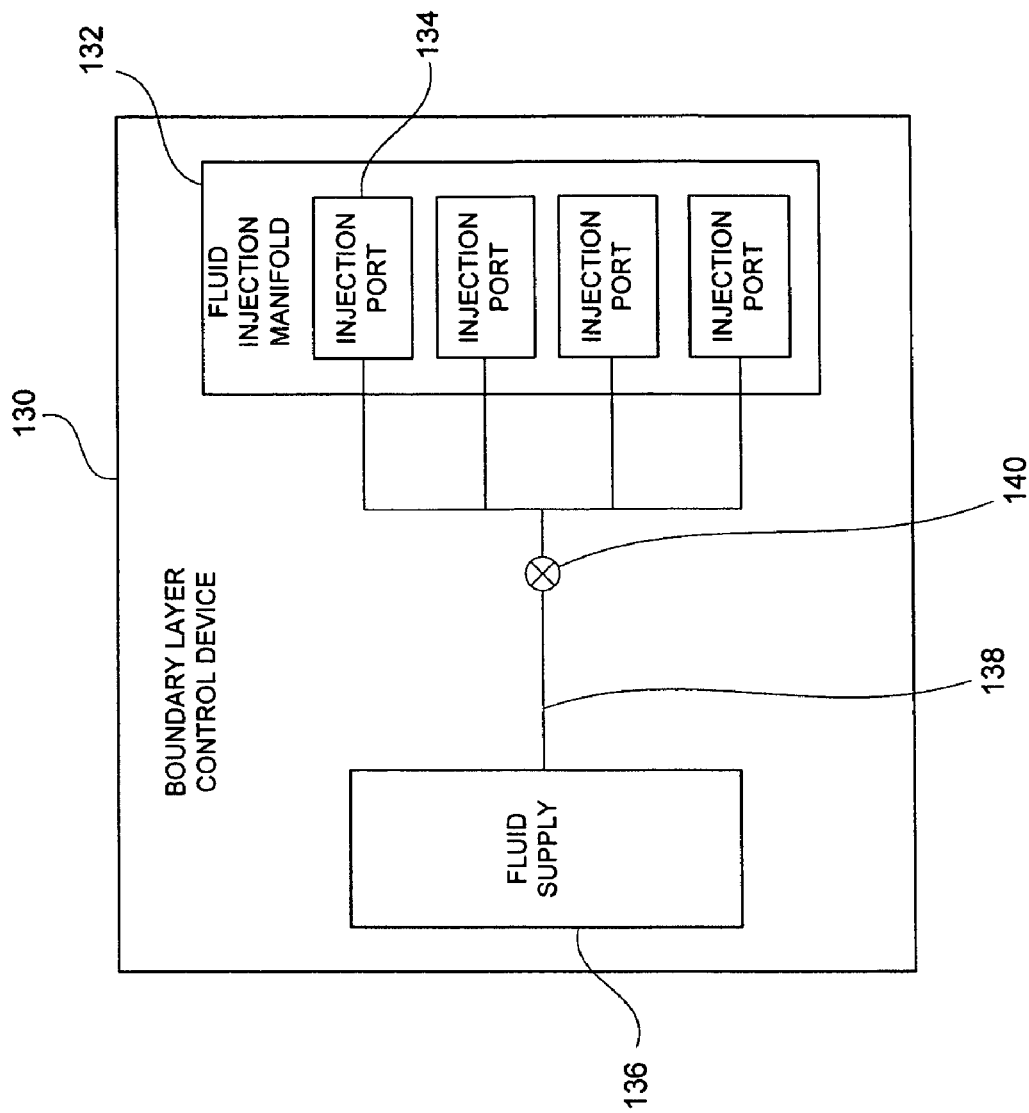
FIG. 2 is a schematic representation of a boundary layer control device that may be used in conjunction with embodiments of the invention.
Figure 3:
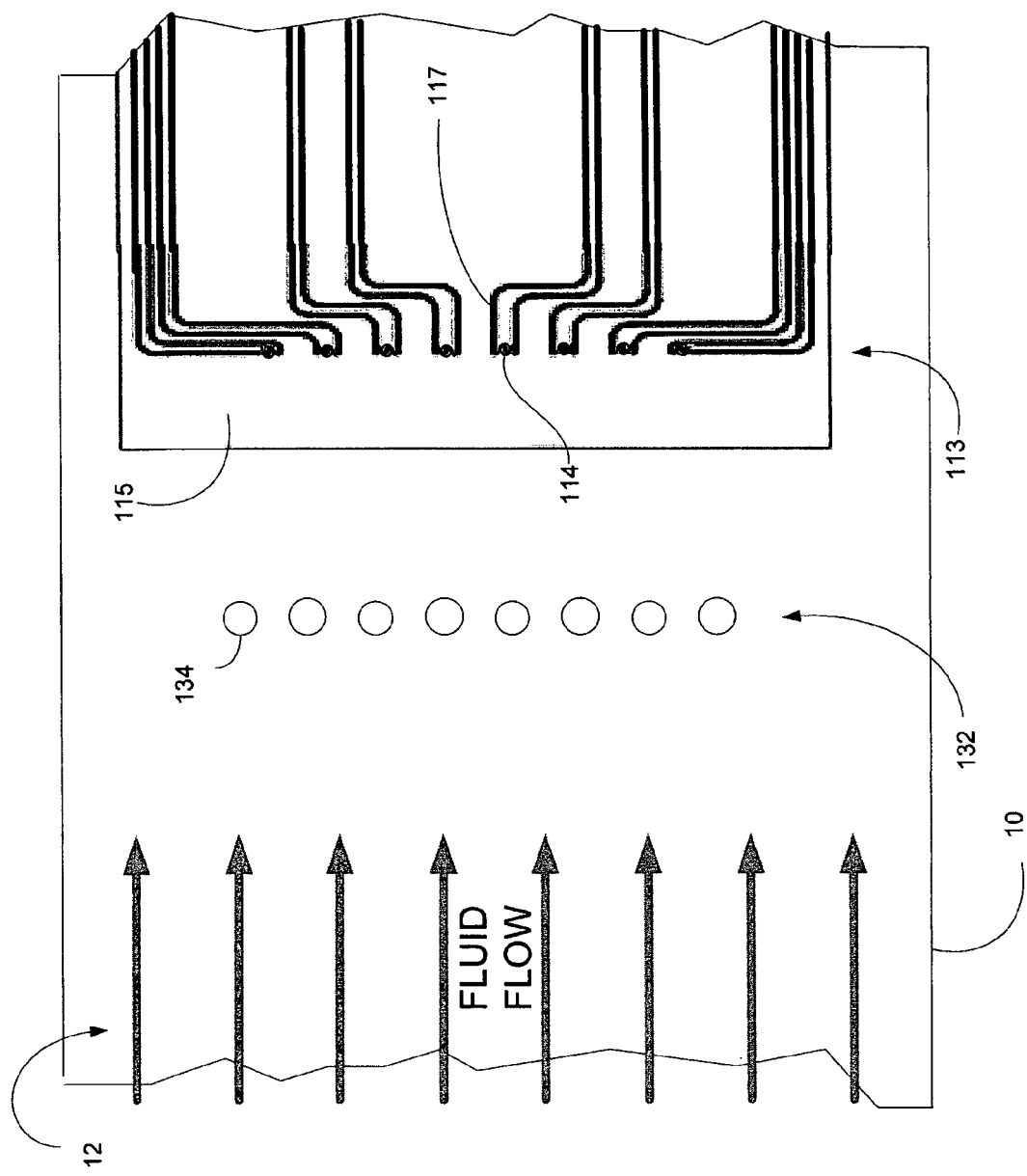
FIG. 3 is a plan view of a surface having fluid injection ports formed therethrough and on which a hot film sensor arrangement has been applied.

With reference to FIGS. 1-3, an illustrative system 100 for monitoring and controlling boundary layer shear stress on the surface of a body 10 includes a shear stress measurement system 110, a control module 120 and a boundary layer control device 130. As shown schematically in FIG. 2, the boundary layer control device 130 may include a fluid injection manifold 132 having a plurality of injection ports 134. As shown in FIG. 3, which depicts a portion of a body 10 to which a fluid injection manifold 132 has been applied, the injection ports 134 may be formed through the surface 12 of the body 10. The injection ports 134 may be in communication with a fluid supply 136 via a supply line 138 for selective supply of fluid to or withdrawal of fluid from the injection ports 132. The supply line 138 may be passed through a valve 140, which may be selectively adjusted to change the pressure in the fluid injection manifold 132 and, thus, the static pressure at the body surface 12.

The shear stress measurement system 110 includes a hot film sensor arrangement 112 disposed downstream of the injection ports 134. The hot-film sensor arrangement 112 may comprise one or more hot-film sensor arrays 113 positioned on the surface 12 of the body 10. Each hot film sensor array 113 comprises one or more hot-film sensor elements 114, which may be of a type formed from a thin metal film layer deposited on an insulated substrate 115 as described in the '493 Patent. The metal film material may be nickel or platinum or other materials with a high and preferably linear changes in temperature coefficient of resistance. The metal film layer is advantageously formed with a thickness less than about 6 microns and preferably in a range from about 4.5 to about 5.5 microns and most preferably in a range from about 4.9 microns to about 5.1 microns. Other thicknesses may be used but may result in degradation of results or loss of integrity. The hot film sensor array 113 may further comprise a plurality of conductive leads 117 formed on the insulated substrate 115. The conductive lead material may be copper, gold or other highly conducting materials. The insulated substrate 115 may be formed from a pliable insulated sheet material that can be used to conform the hot film sensor elements 114 to surface contours. In some embodiments, the hot film sensor elements 114 may be formed in situ on the body surface 12.

Although hot film sensor elements are used in the exemplary embodiments discussed herein, it will be understood that other thin film elements may also be used.

Figure 4:
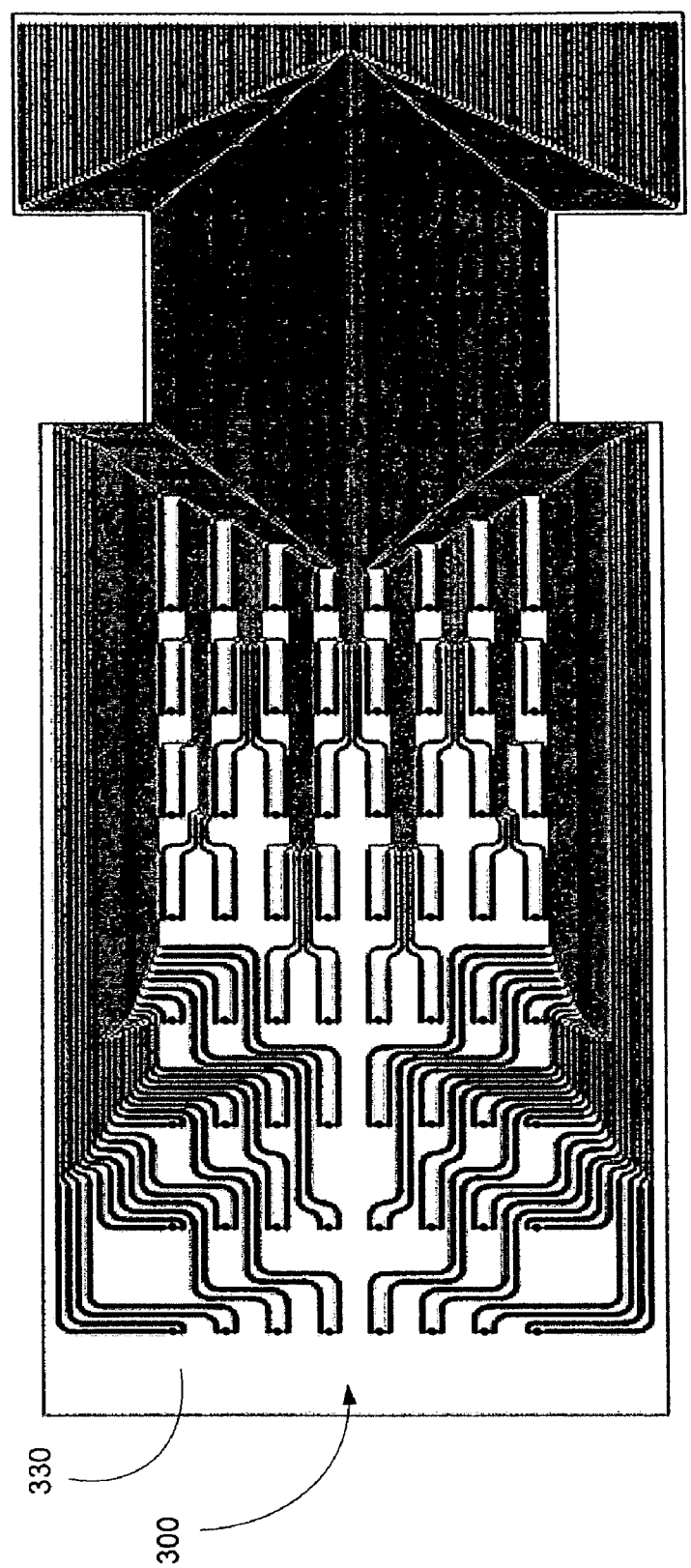
FIG. 4 is a plan view of a hot film sensor arrangement having a two dimensional matrix of sensor elements.
Figure 5:
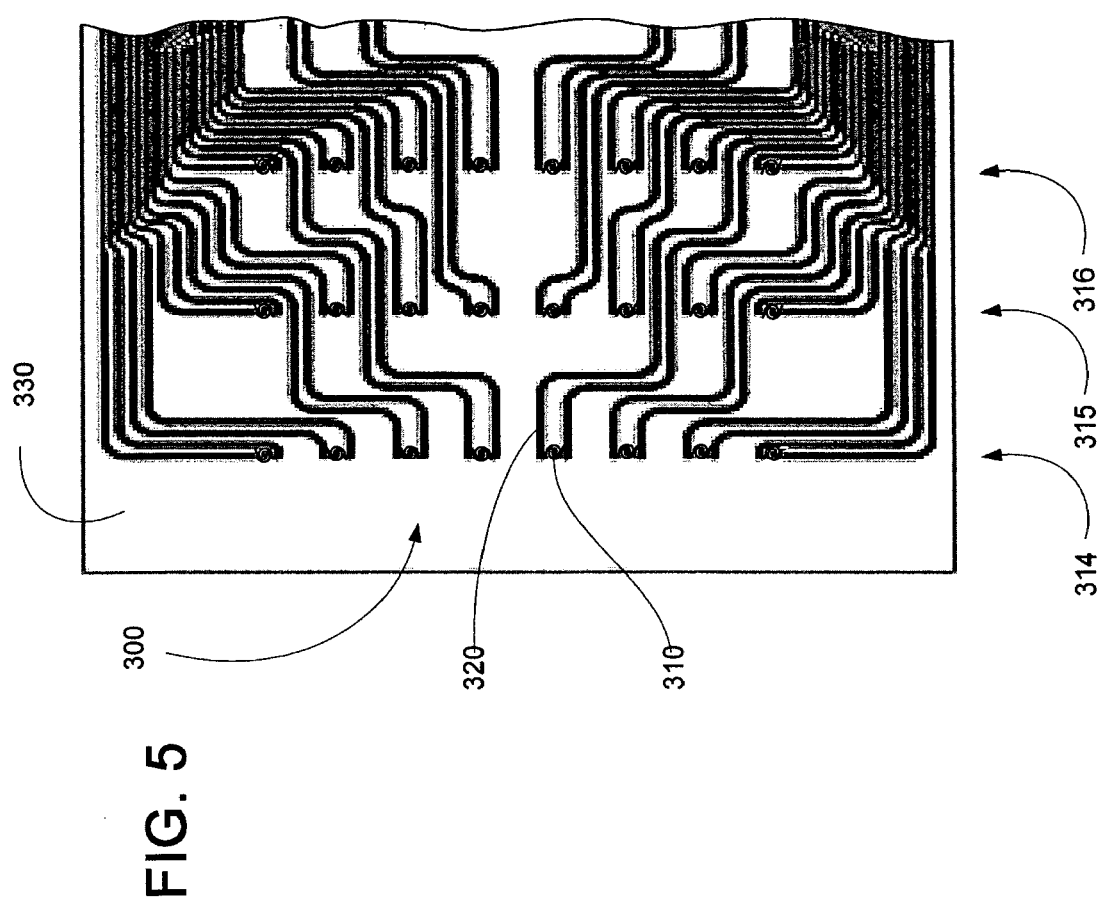
FIG. 5 is a close-up view of a portion of the hot film sensor arrangement of FIG. 4.
Figure 6:
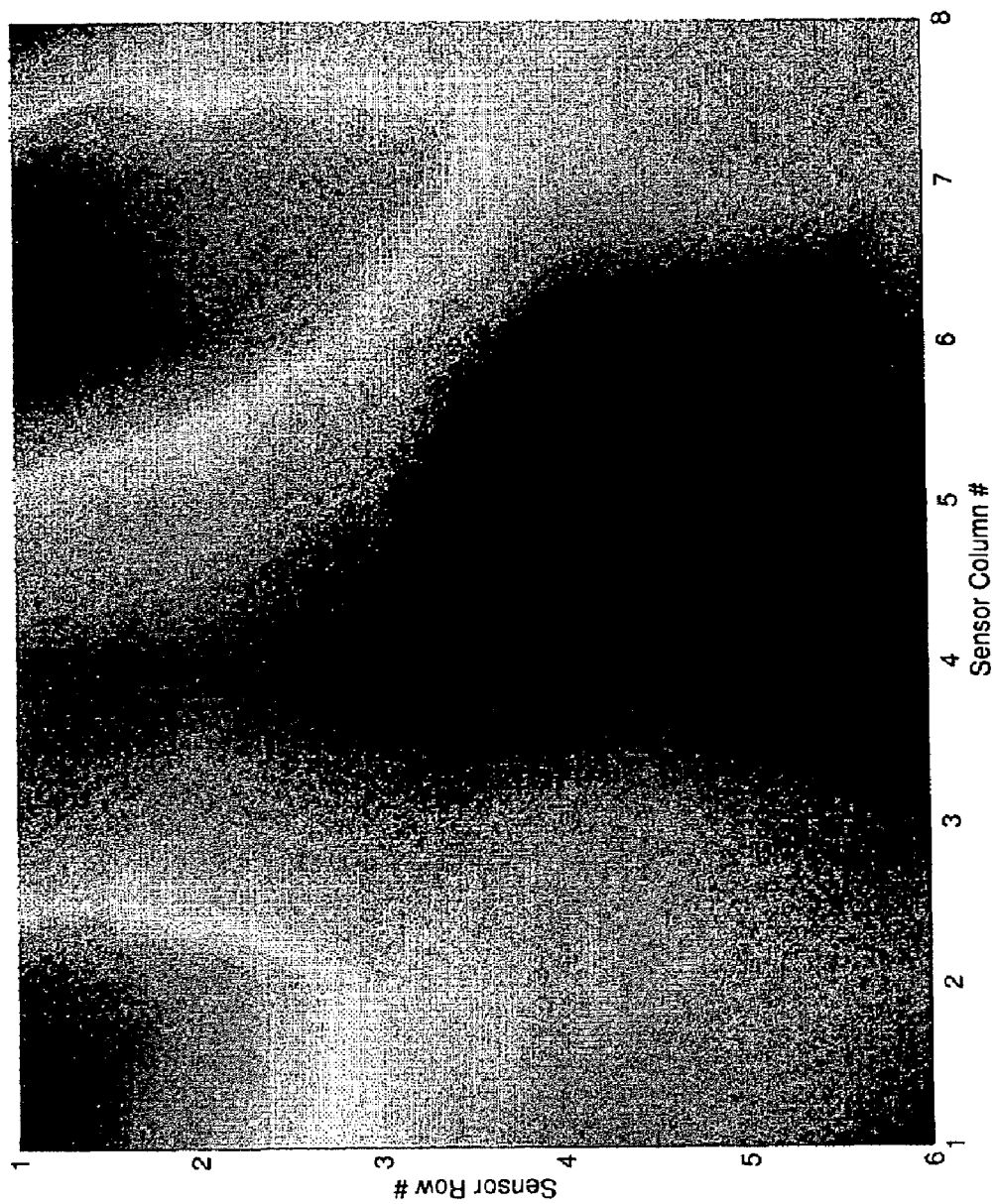
FIG. 6 is a contour plot of shear stress based on signals provided by a hot film sensor arrangement having a two dimensional matrix of sensor elements.
Figure 9:
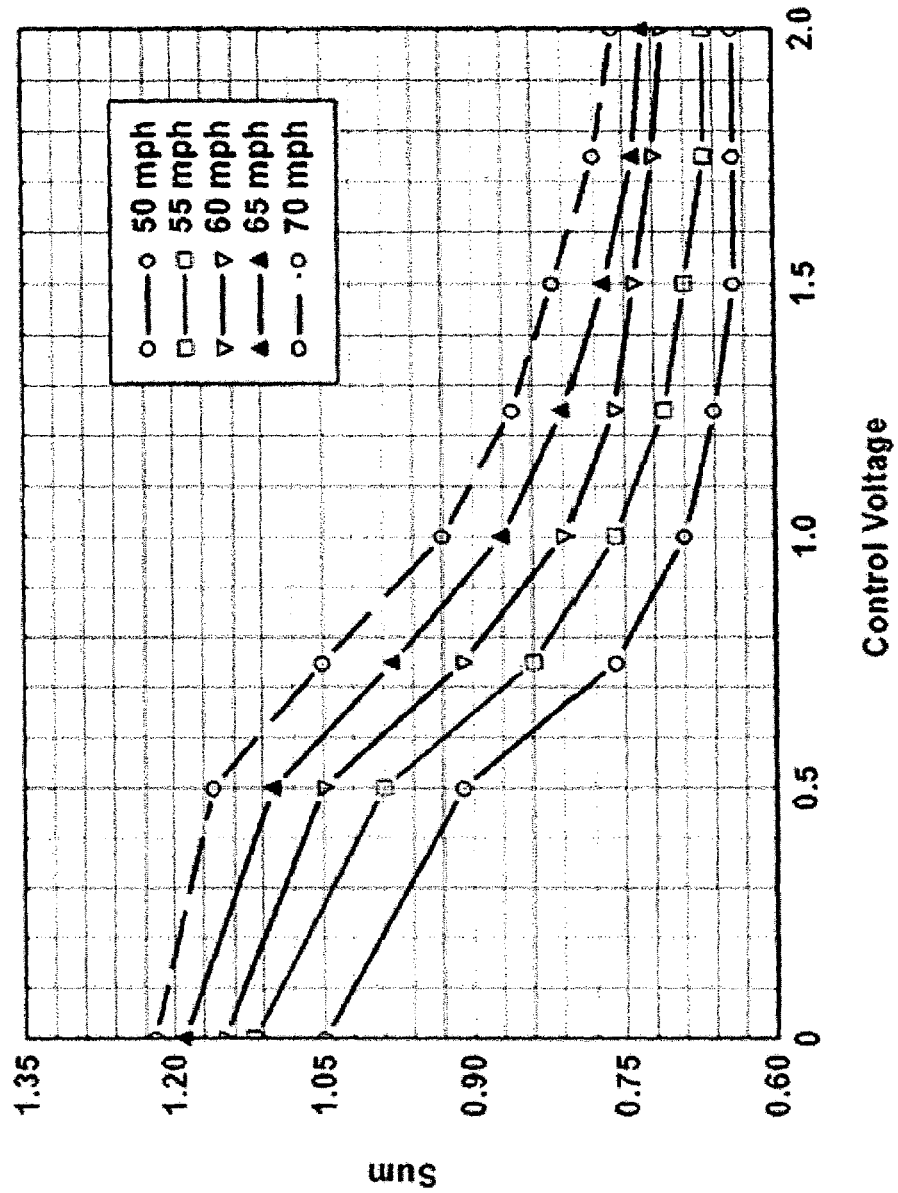
FIG. 9 is a graphical representation of hot film sensor output during open loop testing of a boundary layer shear stress control system according to an embodiment of the invention.
Figure 10:
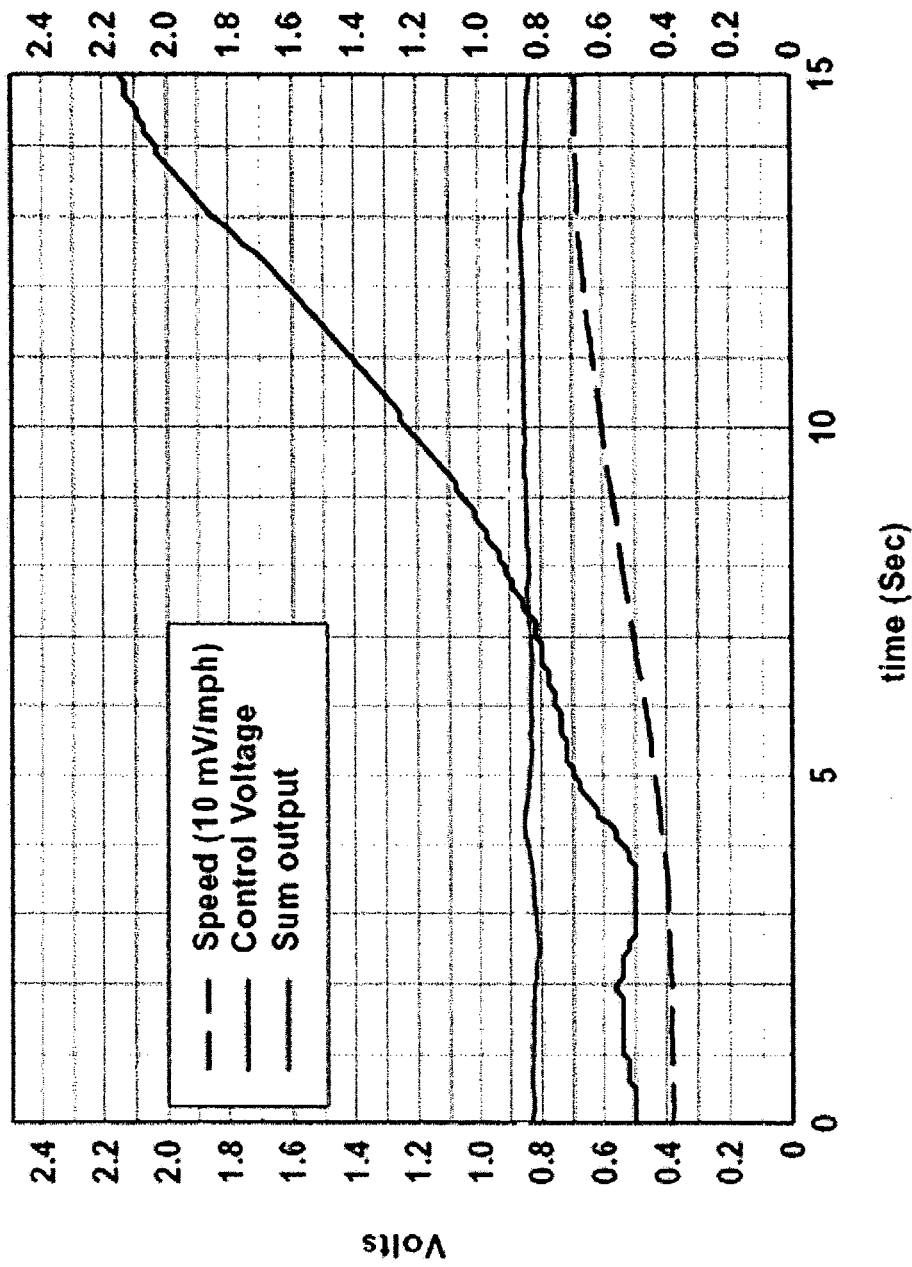
FIG. 10 is a graphical representation of response data from closed loop testing of a boundary layer shear stress control system according to an embodiment of the invention.

The number and spacing of the hot-film-sensor elements 114 may be tailored to a particular application. For two-dimensional flow sensor elements may be arranged in a straight line or a zig-zag pattern primarily along the stream direction. A two-dimensional sensor matrix may be used when the flow is three-dimensional. FIGS. 4 and 5 illustrate a hot film sensor arrangement 300 having a plurality of sensor elements 310 and associated leads 320 wherein the sensor elements 310 are arranged in a series of columns and rows on a flexible, insulated substrate 330. The first three rows 314, 315, 316 of sensor elements 310 are shown in FIG. 9. This type of sensor arrangement makes it possible to trace shear stress patterns both in the streamwise and transverse directions. Such situations may arise when complex vortex systems occur due to the presence of a strong curvature in the flow direction causing the shear stress pattern to vary both in the streamwise and transverse directions. A typical example of such a flow problem is encountered in compact diffusing inlets and ducts. FIG. 10 illustrates the a surface shear stress pattern as measured using a two dimensional hot film sensor arrangement. The illustrated shear stress pattern results from the presence of two strong vortices within a strongly curved duct. The dark regions near the top of the diagram indicate the presence of high shear stress at the centers of the vortices. The dark region in the lower half of the diagram is a low shear region that lies between the vortices. The output voltage from the sensor elements provides an indication of the relative strength of these vortices. This information can be used in the systems and methods of the invention as a means of controlling the formation and growth of such vortices.

The leads 117 connect each hot film sensor element 114 to an associated anemometer circuit 116 in communication with the control module 120. Although any suitable anemometer circuit may be used, particularly suitable results have been obtained using the constant voltage anemometer circuit described above. The anemometer circuit 116 provides a signal to the control module 120 based on the heat transfer from the hot-film sensor elements 114 to the fluid stream flowing around the body 10. As discussed in the '959 and '493 Patents, this signal is a function of the boundary layer shear stress at the location of the sensor element 114.

The control module 120 is in communication with the valve 138 for providing input commands thereto. The control module 120 may be any form of processor or controller adapted for converting the signals from the sensor elements 114 to input commands for the valve 138. In a particular embodiment, the control module 120 may be a digital data processor that may be programmed with a predetermined control logic for processing the sensor signals and converting them to valve commands. The control module 120 may be associated with or a part of a data processor adapted for identification and characterization of CFFIs as described in the '493 Patent and the '666 Application.

It will be understood that the control logic may be adapted to provide desired responses to changes in the shear stress environment. For example, the system may be adapted to maintain a maximum shear stress level or to maintain shear stress in a particular range. Gains in the control logic may be determined empirically.

Figure 7:
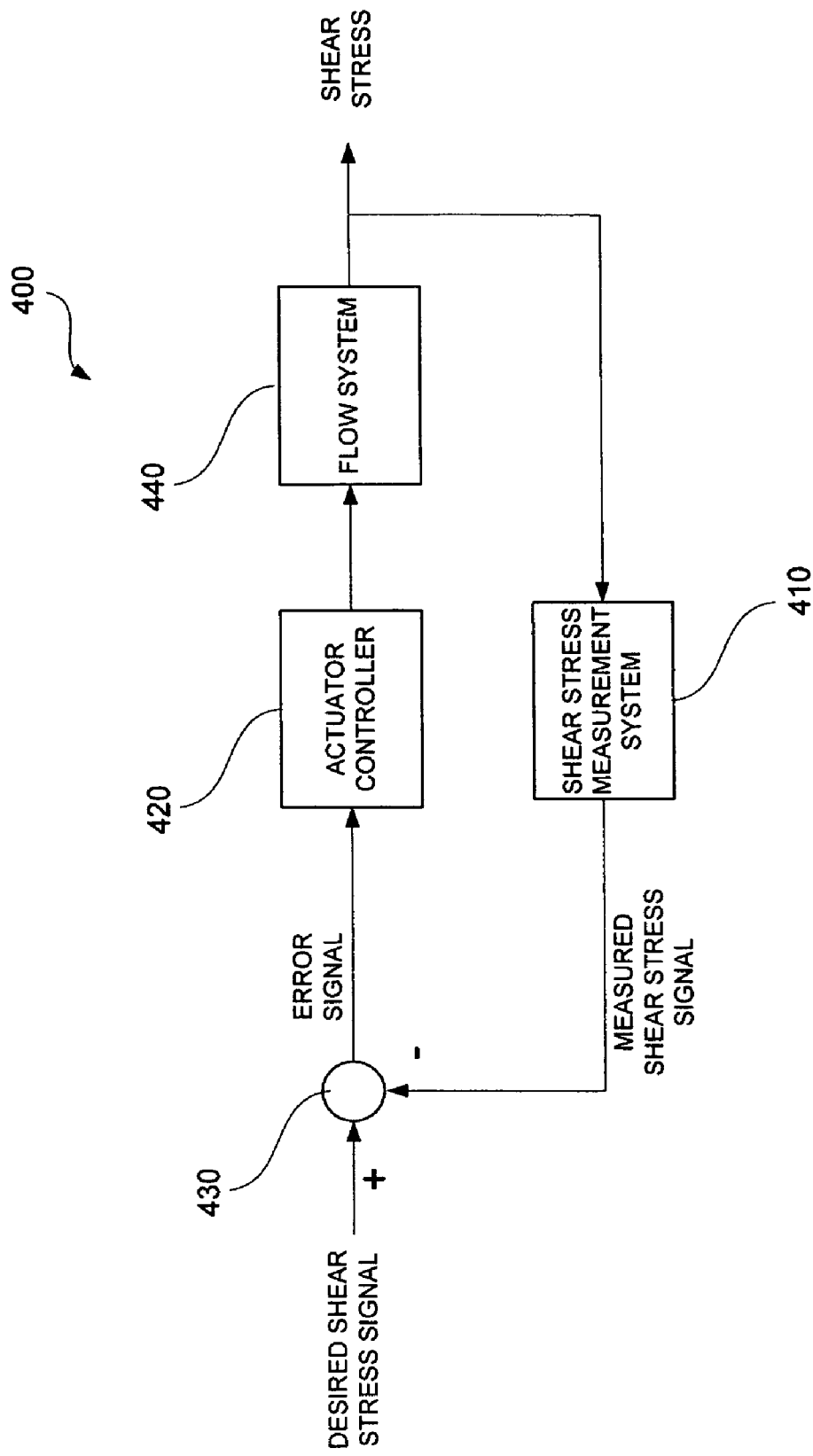
FIG. 7 is a schematic representation of a demonstrated system for controlling boundary layer shear stress according to an embodiment of the invention.
Figure 8:
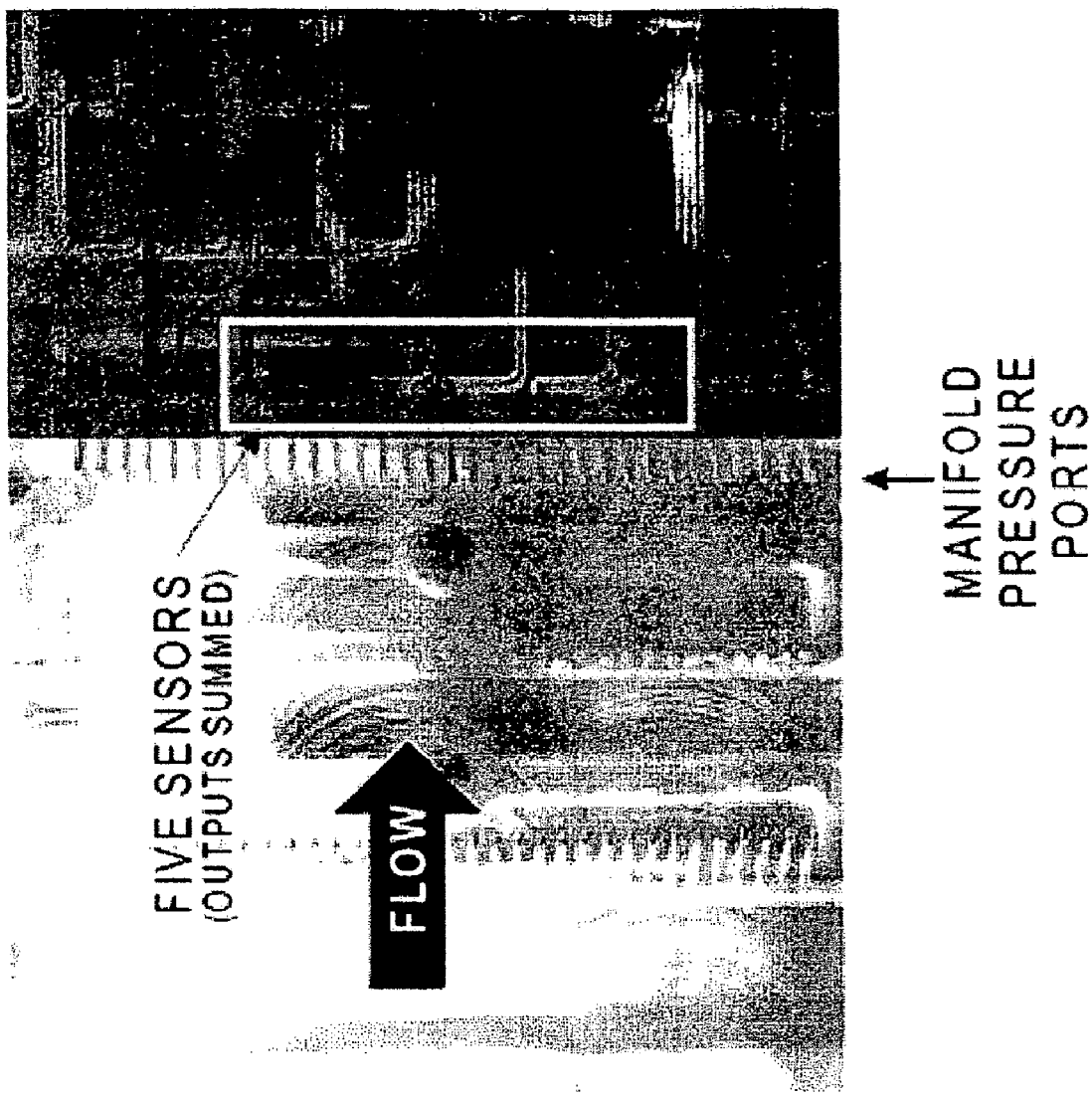
FIG. 8 is a photographic view of a wind tunnel surface having fluid injection ports formed therethrough and on which a hot film sensor arrangement has been applied in accordance with a method of the invention.

With reference to FIGS. 7 and 8, a closed loop control system 400 according to an embodiment of the invention has been demonstrated in two dimensional, low speed flow regimes. Specifically, the system 400 has been used to demonstrate the ability to control the shear stress on a wind tunnel wall using a hot film shear stress measurement system 410 comprising five sensor elements placed on the wall downstream of an injection manifold. A close-up photograph of the shear stress control system used for these tests is shown in FIG. 8. The hot-film sensor elements are operated in conjunction with CVAs to measure the shear stress. In the schematic illustration of the control system 400 shown in FIG. 7, the flow system 440 represents the wind tunnel wall and the injection manifold, which is controlled by actuator controller 420. The output of the control system 400 is the shear stress at the tunnel wall just downstream of the injection ports of the manifold. The shear stress is sensed by the sensor elements of the shear stress measurement system 410, which produces a shear stress signal. In closed loop operation, this signal is subtracted from a desired shear stress signal at a summing junction 430 and the resulting error signal fed into the controller 420. Based on this signal, the controller 420 sends commands to the actuator or valve controlling the pressure manifold.

FIG. 9 shows the static open loop response of the system to changes in wind tunnel speed and control voltage inputs to the manifold pressure valve. The control voltage changes shown in FIG. 9 correspond to manifold pressure changes ranging from 0 to 1.75 psi. In FIG. 9 and subsequent test result plots, the term 'sum' indicates the summed voltage changes for all five CVA channels. The summed voltage change is an index of the shear stress change sensed by the hot film sensor elements in the flow over the wall from based on convective heat transfer.

FIG. 9 illustrates that injecting manifold pressure ahead of the hot film sensor location systematically reduces the 'sum' voltage, which means the shear stress is systematically reduced as manifold pressure is increased. FIG. 9 also shows that the maximum change in the shear stress occurs before about 1.0 volt control voltage (about 0.8 psi pressure) and thereafter changes only marginally. Numerical values of the data in FIG. 9 indicate that there is a marginal increase in the shear stress drop as the speed increases. These plots show that the tunnel speed and control voltage (manifold pressure) produce predictable changes in the shear stress that provide a basis for control laws that can be used in a control module to actively control the shear stress level at the tunnel wall.

The results of the open loop test were used to establish control logic for closed loop operation. As discussed above, in the closed loop mode, the actuator controller 420 uses the difference between the set point, or desired shear stress, and the sensed shear stress to set a new actuator control voltage. The actuator then changes the flow system so that the shear stress is closer to the set point. In the tests conducted using this system, the controller 420 was adapted to scale the summed shear stress difference proportionally in order to produce a new actuator control voltage. The proportional gain used by the controller was determined from the open-loop test results.

FIG. 10 shows the results of a closed loop test where the wind tunnel speed is swept from about 40 mph to about 70 mph over 15 seconds. The closed loop system was configured to maintain a constant shear stress level as the speed increased. The results shown in FIG. 10 clearly show that the sum voltage remained essentially constant at 0.83 volts across this speed range. FIG. 10 also shows the large swing in the control voltage needed to hold the sum voltage, and thus shear stress, at a constant level.

Figure 11A:
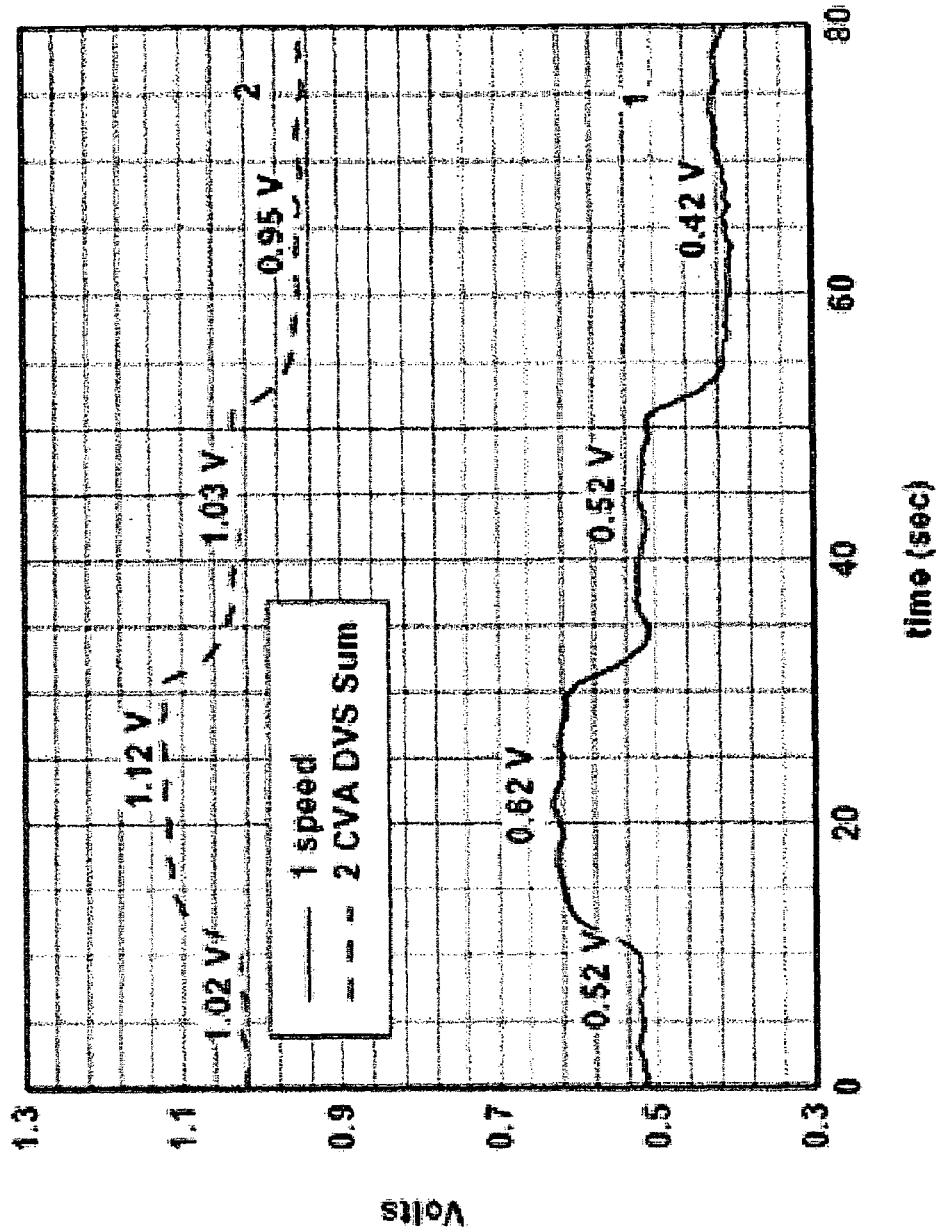
FIGS. 11a and 11b are graphical representations of response data from open loop testing of a boundary layer shear stress control system according to an embodiment of the invention.
Figure 11B:
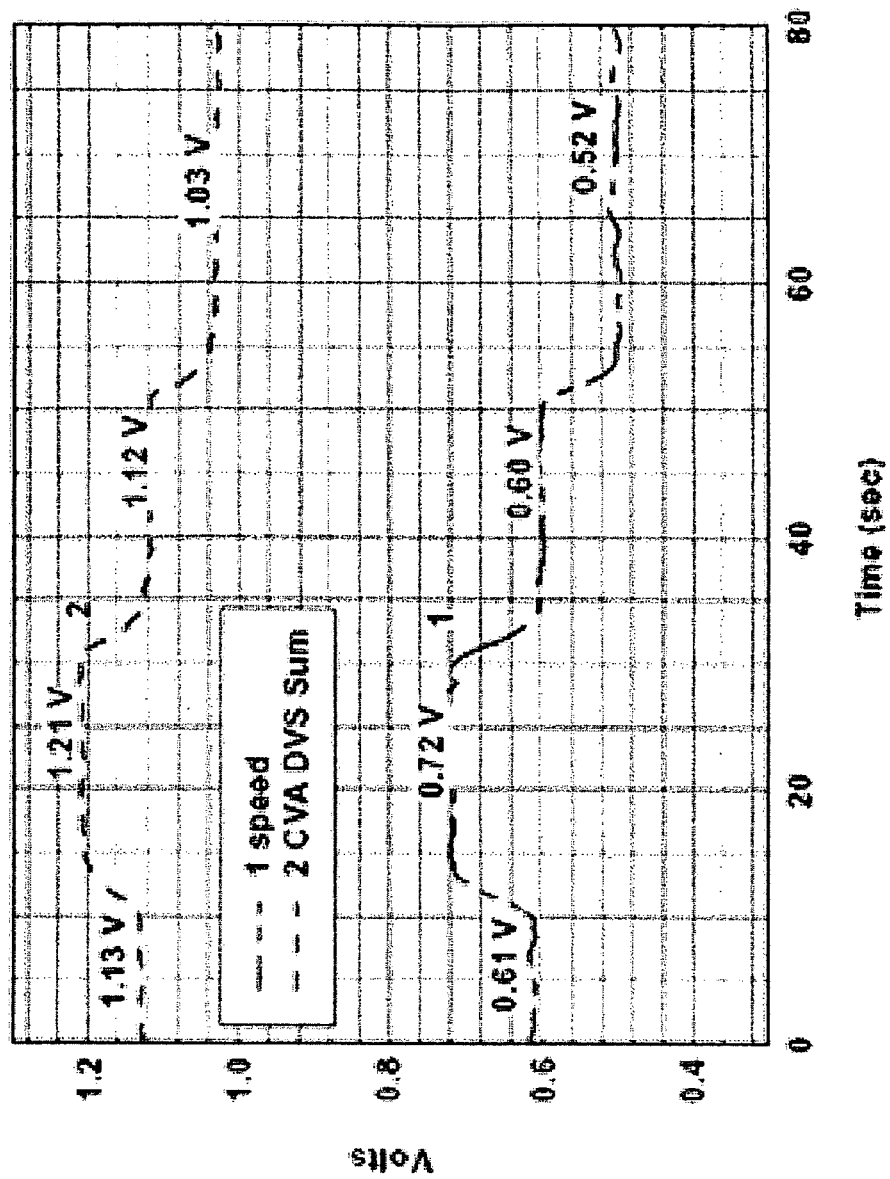

FIGS. 11a and 11b show open loop response changes (without any manifold pressures or any control) of the sum voltage to step changes in speed. They show that the sum changes by about 0.1 volt at 52 mph and 0.08 volt at 60 mph for a 10 mph change in speed. (10 mV per mph for speed) Speed is changed between 62 mph and 42 mph in FIG. 11a and 72 mph and 52 mph in FIG. 11b.

Figure 12A:
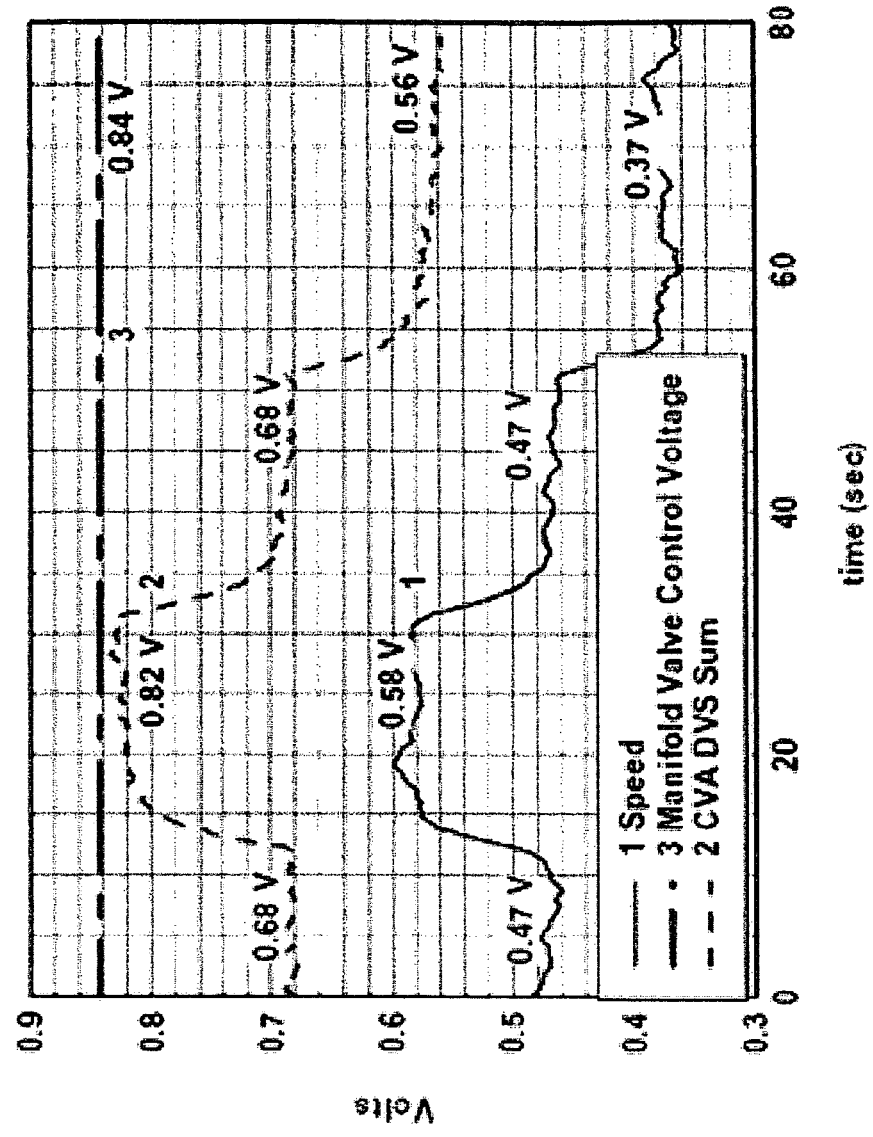
FIGS. 12a and 12b are graphical representations of response data from open loop testing of a boundary layer shear stress control system according to an embodiment of the invention.
Figure 12B:
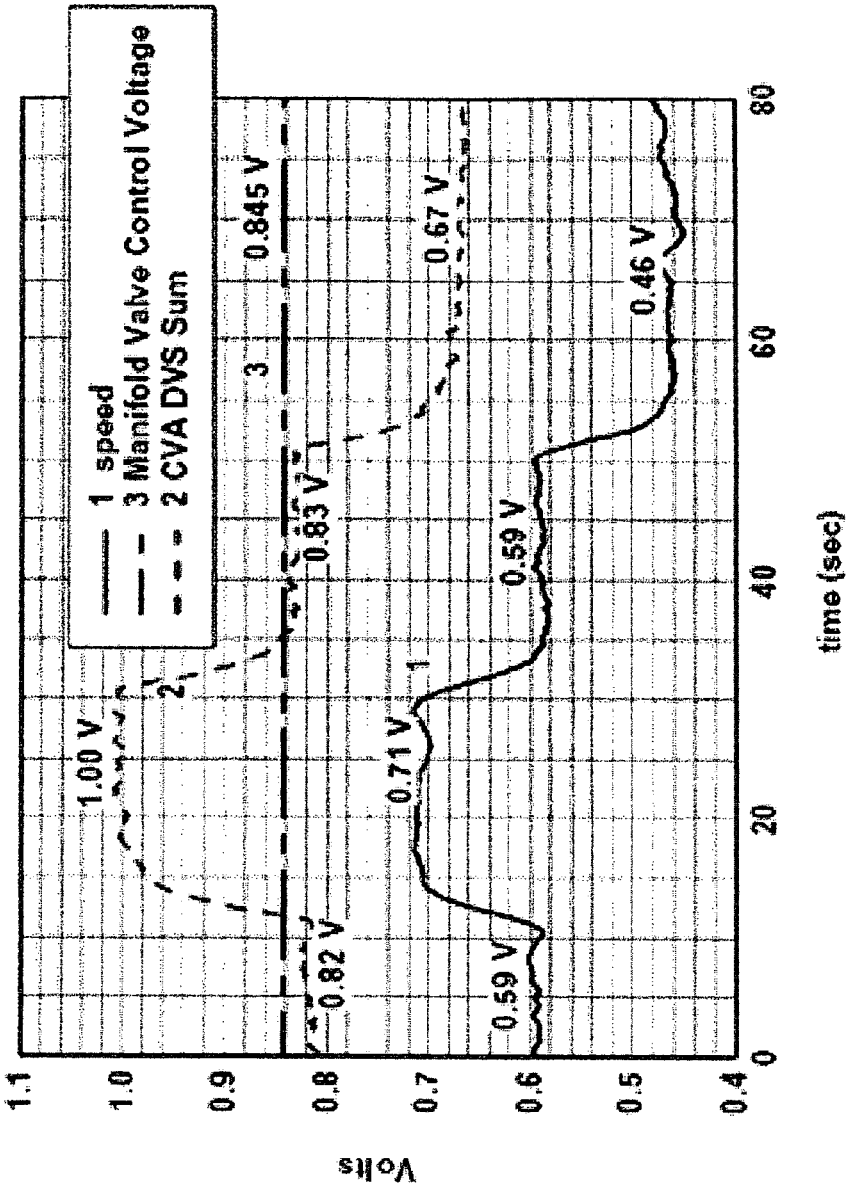

FIGS. 12a and 12b shows, for two tunnel speeds, the changes in sum voltage for steps in applied manifold pressure (about 1 psi) with the operation of the valve held constant at 0.84 volts. For the two speeds indicated in FIGS. 12a and 12b, the sum voltage with the manifold pressure now changes by larger values: 0.14 volts and 0.18 volts respectively (compared to 0.1 volts and 0.08 volts in FIGS. 11a and 11b without any manifold pressure). Notably, the absolute value of the sum was reduced at almost the same speeds with the manifold pressure applied.

Figure 13A:
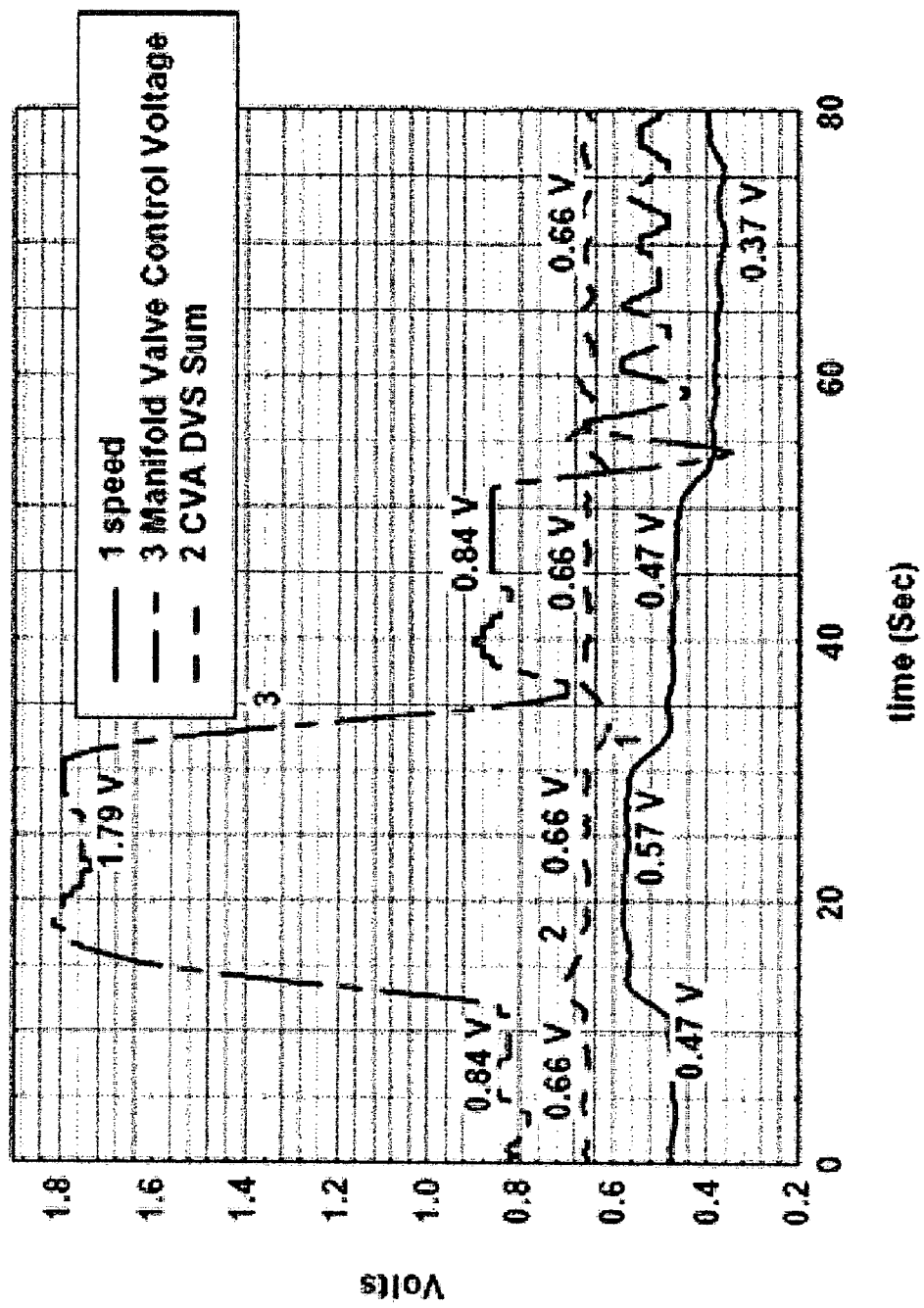
FIGS. 13a and 13b are graphical representations of response data from closed loop testing of a boundary layer shear stress control system according to an embodiment of the invention.
Figure 13B:
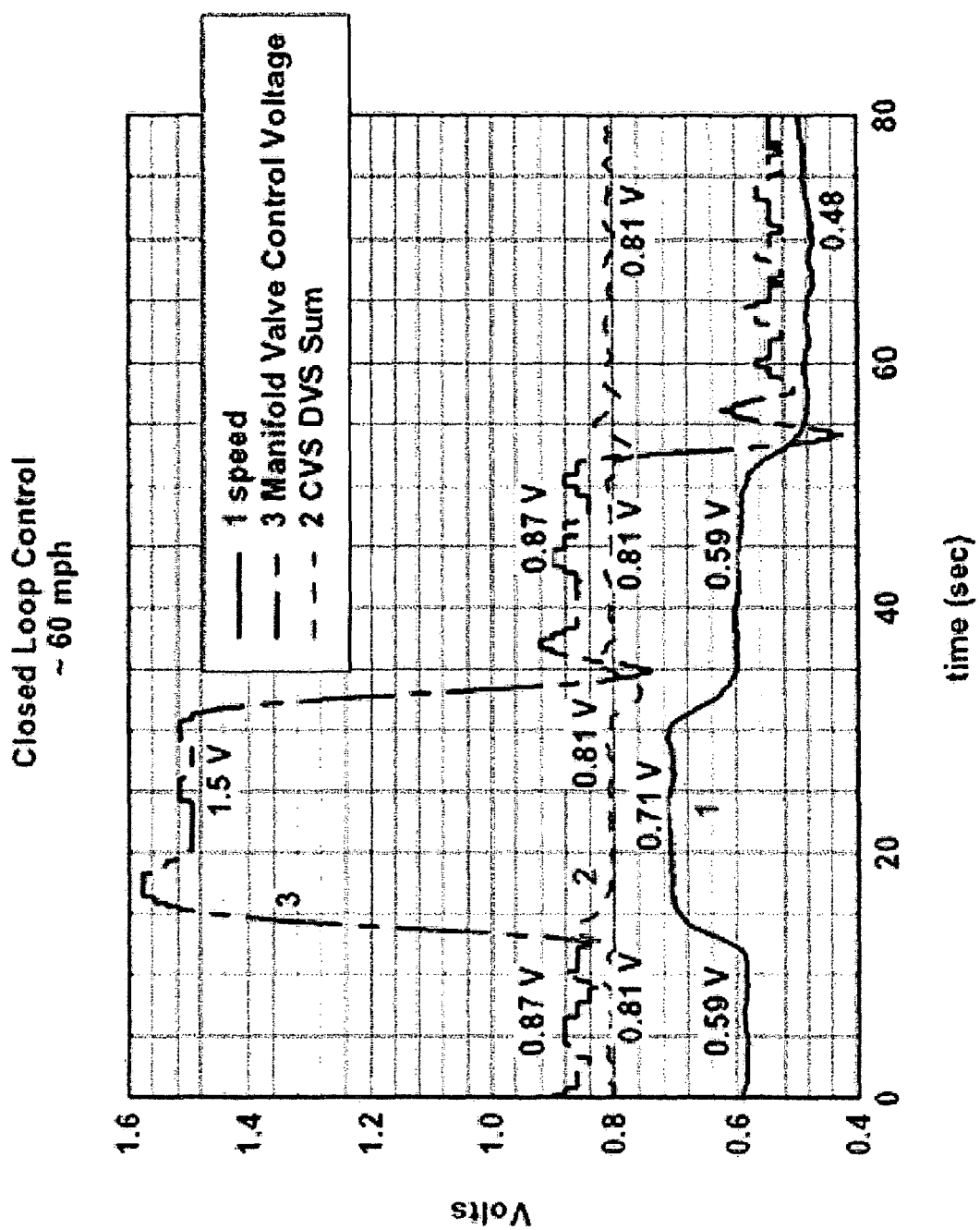

FIGS. 13a and 13b shows the closed loop response to step changes in speed. The manifold pressure control valve is included in the feedback loop to keep the sum voltage constant at the initial set value in the presence of changes in speed. It can be seen from FIGS. 13a and 13b that, at both the speeds, the sum voltage (and thus shear stress) remained substantially constant. The sum voltage stayed constant at 0.66 volts and 0.81 volts at the two speeds, respectively. These results may be compared to the 0.14 volt and 0.18 volt changes that resulted from similar speed changes when feedback control was not used (see FIGS. 12a and 12b). The surge in the manifold valve control voltage required to keep the sum voltages constant can be readily seen in FIGS. 13a and 13b.

These tests clearly demonstrate the capability to control the shear stress in real time. It will be understood by those of ordinary skill in the art that the control systems of the invention are not limited to feedback control system. They may, for example, be adapted for use in feedforward or hybrid systems. This is particularly useful for high-speed inlet flow control where the control system must change the flow system predictively.

It will be understood by those of ordinary skill in the art that the systems and methods of the invention may be applied to any object or vehicle immersed in a fluid stream and are particularly adaptable for use in flight vehicles and watercraft. The invention may be applied to vehicles in their entirety or to particular structures including but not limited to hulls, wings, rudders, stabilizers, rotors and control surfaces. The invention may also be applied to scale models or portions of models for testing in wind tunnel or hydrodynamic simulation test facilities.

It will also be understood that the systems and methods of the invention are applicable to internal flow (e.g., pipe flow, inlets, ducts, etc.) as well as external flow.

The present invention provides a system for controlling boundary layer characteristics in real-time. This is accomplished through the use of a measurement system that provides accurate real-time measurement of changes in shear stress and other boundary layer parameters. This measurement system also provides the capability of simultaneously mapping and controlling critical flow features such as flow bifurcation and transition between laminar and turbulent flow regimes. The system exhibits high sensitivity, fast response, high reliability and low susceptibility to noise and drift.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A system for controlling boundary layer shear stress adjacent a surface over which a fluid stream has been established, the system comprising:
    a boundary layer control device adapted for altering at least one flow characteristic within a boundary layer in a selected region of the surface;
    a shear stress measurement system comprising a hot film sensor arrangement having at least one hot film sensor element appliable to the surface in the selected region, the at least one hot film sensor element being included in an anemometer circuit configured to provide a sensor signal corresponding to heat transfer from the associated hot film sensor to the fluid stream; and
    a control module in communication with the anemometer arrangement and the boundary layer control device, the control module being adapted for receiving and processing sensor signals signal from the anemometer circuit and for providing input signals to the boundary layer control device,
    wherein the boundary layer control device comprises a fluid injection manifold comprising at least one injection port formed through the surface, the fluid injection manifold being adapted for selectively injecting or withdrawing fluid from the boundary layer based on a manifold pressure and means for controlling the manifold pressure.

2. A system according to claim 1 wherein the at least one hot-film sensor element comprises a thin metal sensor layer having a material thickness less than about 6 microns.

3. An automated system according to claim 2 wherein the metal sensor layer is formed from nickel deposited on an insulated substrate.

4. An automated system according to claim 1 wherein the anemometer circuit is a constant voltage anemometer circuit.

5. A system according to claim 1 wherein the means for controlling the manifold pressure includes a fluid supply in selective communication with the fluid injection manifold via a supply line and a controllable valve intermediate the fluid supply and the fluid injection manifold, the controllable valve being adapted for selectively establishing the manifold pressure in response to input commands from the control module.

6. A system according to claim 1 wherein the at least one sensor element is appliable downstream of the at least one injection port.

7. A method for controlling a boundary layer shear stress level on a surface over which a fluid stream has been established, the method comprising:
    mounting a boundary layer control device to the surface, the boundary layer control device being adapted for altering at least one flow characteristic within a boundary layer in a selected region of the surface;
    applying at least one hot film sensor element to the surface in the selected region, the at least one hot film sensor element being connected to an anemometer circuit configured to provide a sensor signal corresponding to heat transfer from the associated hot film sensor to the fluid stream;
    establishing a fluid flow stream over the surface;
    receiving a sensor signal from the anemometer circuit, the sensor signal being associated with a shear stress level produced by the fluid stream; and
    providing a control signal to the boundary layer control device based on a comparison of the sensor signal to a predetermined criterion,
    wherein the boundary layer control device comprises a fluid injection manifold having at least one injection port formed through the surface, the fluid injection manifold being adapted for selectively injecting or withdrawing fluid from the boundary layer based on a manifold pressure, a fluid supply in selective communication with the fluid injection manifold via a supply line, and a controllable valve adapted for receiving the control signal and establishing the manifold pressure in response thereto.

8. A method according to claim 7 wherein the actions of receiving a sensor signal and providing a control signal are carried out by an automated control module in communication with the anemometer arrangement and the boundary layer control device.

* * * * *